United States Patent
Kang et al.

(10) Patent No.: US 9,990,075 B2
(45) Date of Patent: Jun. 5, 2018

(54) DISPLAY DEVICE AND METHOD OF DRIVING THE SAME

(71) Applicant: LG DISPLAY CO., LTD., Seoul (KR)

(72) Inventors: Seong Kyu Kang, Paju-si (KR); Hoon Bae Kim, Goyang-si (KR); Sung Su Han, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 100 days.

(21) Appl. No.: 14/537,534

(22) Filed: Nov. 10, 2014

(65) Prior Publication Data

US 2015/0161964 A1 Jun. 11, 2015

(30) Foreign Application Priority Data

Dec. 10, 2013 (KR) .................. 10-2013-0152782

(51) Int. Cl.
| | |
|---|---|
| *G09G 5/18* | (2006.01) |
| *G06F 3/041* | (2006.01) |
| *G06F 3/044* | (2006.01) |
| *G09G 3/20* | (2006.01) |
| *G09G 3/36* | (2006.01) |

(52) U.S. Cl.
CPC ............ *G06F 3/0416* (2013.01); *G06F 3/044* (2013.01); *G06F 3/0412* (2013.01); *G09G 3/20* (2013.01); *G09G 3/3648* (2013.01); *G09G 2310/08* (2013.01)

(58) Field of Classification Search
CPC ....... G06F 3/044; G06F 3/0416; G09G 5/006; G09G 5/18
See application file for complete search history.

(56) References Cited

U.S. PATENT DOCUMENTS

2005/0264535 A1 12/2005 Johnson et al.
2009/0096760 A1 4/2009 Ma et al.
(Continued)

FOREIGN PATENT DOCUMENTS

CN 1678980 A 10/2005
CN 101251667 A 8/2008
(Continued)

*Primary Examiner* — Carolyn R Edwards
(74) *Attorney, Agent, or Firm* — Dentons US LLP (57) ABSTRACT

Disclosed are a display device and method of driving the same in which a display panel may include a plurality of gate lines, a plurality of data lines and a touch panel, the touch panel including a first touch electrode group where s number of horizontal electrodes and k (which is less than s) number of longitudinal electrodes cross each other; and a touch sensing unit that during a first period of a plurality of touch sensing periods included in a one frame period, determines whether at least one of the s number of horizontal electrodes is touched based on a plurality of sensing signals received from at least two of the s number of horizontal electrodes, and during a second period of the plurality of touch sensing periods, determines whether at least one of the s number of horizontal electrodes, which is either the same or different from the at least one of the s number of horizontal electrodes determined during the first period, is touched based on one or more sensing signals received from at least one of the k number of longitudinal electrodes.

12 Claims, 5 Drawing Sheets

(56) References Cited

U.S. PATENT DOCUMENTS

| | | | | |
|---|---|---|---|---|
| 2013/0082954 A1* | 4/2013 | Azumi | ............... | G06F 3/041 345/173 |
| 2014/0028616 A1* | 1/2014 | Furutani | ............ | G06F 3/044 345/174 |
| 2014/0184313 A1* | 7/2014 | Chuang | ............... | G06F 3/044 327/517 |
| 2014/0198268 A1* | 7/2014 | Sugita | ................. | G06F 3/044 349/12 |
| 2014/0375598 A1* | 12/2014 | Shen | ................... | G06F 3/044 345/174 |
| 2015/0130747 A1* | 5/2015 | Tsai | ................. | G06F 3/0412 345/174 |
| 2015/0234505 A1* | 8/2015 | Kurasawa | ........... | G06F 3/047 345/174 |

FOREIGN PATENT DOCUMENTS

| | | |
|---|---|---|
| CN | 101968581 A | 2/2011 |
| TW | 201310318 A1 | 3/2013 |

* cited by examiner

DISPLAY DEVICE AND METHOD OF DRIVING THE SAME

CROSS-REFERENCE TO RELATED APPLICATIONS

This application claims the benefit of the Korean Patent Application No. 10-2013-0152782 filed on Dec. 10, 2013, which is hereby incorporated by reference for all purposes as if fully set forth herein.

BACKGROUND OF THE INVENTION

Field of the Invention

The present invention relates to a display device and a method of driving the same, and more particularly, a display device including a touch panel and a method of driving the same.

Discussion of the Related Art

Touch panels are a type of input device that is included in a display device such as liquid crystal display (LCD) devices, plasma display panels (PDPs), organic light emitting display device (OLED) and electrophoretic displays (EPDs), and that enables a user to input information by directly touching the screen with a finger, a pen or the like while looking at the screen of the display device.

A touch panel may be manufactured independently from a display panel of a display device, and then may be attached to an upper surface of the display panel or may be provided as one body integrated with the display panel.

For example, a touch panel may be categorized into an in-cell type in which the touch panel is built into the pixels of the display panel, an on-cell type in which the touch panel is provided on the display panel, and an add-on type in which the touch panel is manufactured independently from the display panel and is then attached to an upper end of the panel.

Recently, the in-cell type touch panel has been receiving attention due to its aesthetic design and slimness. That is, the demand for a display device including such an in-cell type touch panel, in which various elements of the touch panel are built into the display panel, is increasing for slim and portable terminals such as smart phones and tablet personal computers (PCs)

Figure 1:
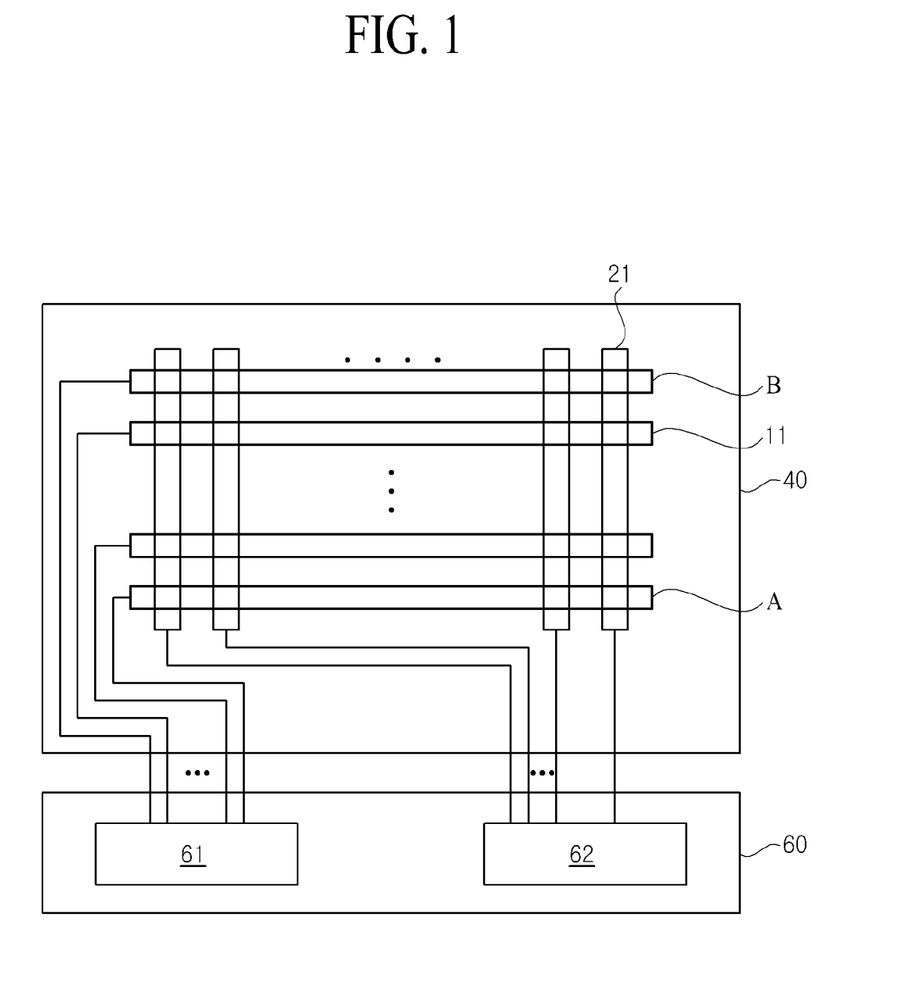
FIG. 1 is an exemplary diagram for describing a method of driving a touch panel according to the related art.
Figure 2:
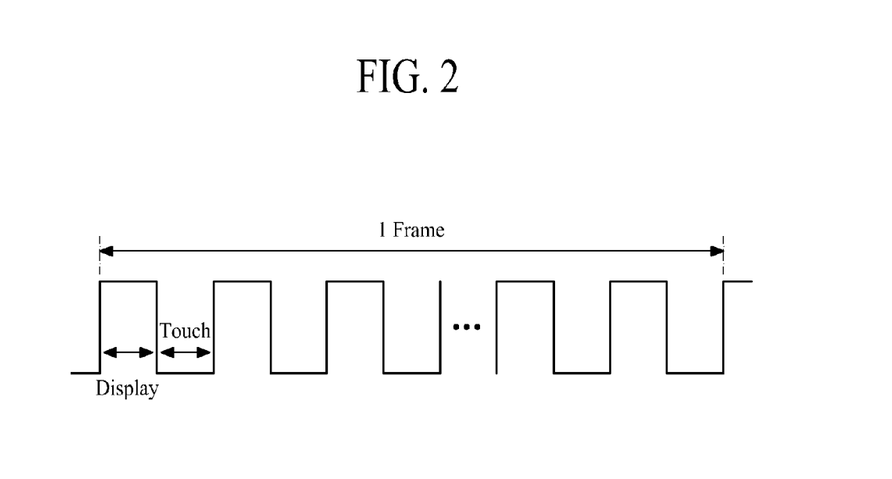
FIG. 2 is a waveform diagram showing an image display period and a touch sensing period in an in-cell type display device according to the related art.

FIG. 1 is an exemplary diagram for describing a method of driving a touch panel according to the related art, and FIG. 2 is a waveform diagram showing an image display period and a touch sensing period in an in-cell type display device according to the related art.

A touch panel is for sensing a user's touch, and may be implemented in various types such as a resistive type and a capacitance type. Hereinafter, a touch panel using the capacitance type will be described with reference to FIG. 1.

Referring to FIG. 1, the touch panel 40 is an in-cell type touch panel, and includes a plurality of driving electrodes 21 for supplying driving voltages. The touch panel 40 further includes a plurality of receiving electrodes 11, which are typically formed in parallel with a plurality of gate lines formed in the display panel into which the touch panel 40 is integrated, for transferring a plurality of sensing signals generated by the driving voltages to a touch sensing unit 60. The touch sensing unit 60 includes a driver 62 for supplying the driving voltages to the driving electrodes 21 and a receiver 61 for determining whether the touch panel 40 is touched by using the sensing signals received from the receiving electrodes 11.

In the display device including the touch panel 40 according to the related art, in order to determine whether the touch panel 40 is touched, the driving voltage is sequentially supplied to the driving electrodes 21, and the sensing signals are received from all the receiving electrodes 11 while the driving voltage is sequentially applied to the driving electrodes 21.

The sensing signal contains information on a change in capacitance that is generated between the driving electrode 21 driven with the driving voltage and the receiving electrode 11, and the touch sensing unit 60 analyzes the change in capacitance to determine whether the touch panel 40 is touched.

In an in-cell type display device, the driving electrodes 21 and the receiving electrodes 11 also functions as a common electrode which is formed in a pixel of the display panel and are supplied with a common voltage.

During an image display period, the driving electrodes 21 and the receiving electrodes 11 perform a function of the common electrode of the pixel driven with the common voltage. Also, during a touch sensing period, the touch sensing unit 60 supplies the driving voltage to the driving electrodes 21, and determines whether the touch panel is touched, by using the sensing signals received from the receiving electrodes 11.

To do so, as shown in FIG. 2, a period of one frame is, for example, divided into the image display period and the touch sensing period.

During the image display period, the common voltage is supplied to the driving electrodes 21 and the receiving electrodes 11. During the touch sensing period, a pulse-type driving voltage is supplied to the driving electrodes 21, and the sensing signals are transferred from the receiving electrodes 11 to the touch sensing unit 60.

When the number of the driving electrodes 21 is p and the number of the receiving electrodes 11 is q, the touch sensing unit 60 receives q number of sensing signals from the q receiving electrodes 11 and analyzes the received sensing signals during the touch sensing period.

The driving electrodes 21 and the receiving electrodes 11 are typically formed on the same plane, with a short distance between adjacent electrodes, which increases the change in capacitance generated between the driving electrodes 21 and the receiving electrodes 11.

The touch panel 40 is typically applied to small electronic devices such as smartphones, tablet personal computers (PCs), notebook computers, monitors, etc. As a result, a parasitic capacitance in the touch panel 40 may not greatly affect the sensing performance.

However, when the touch panel 40 is applied to large-sized display devices such as large televisions (TVs), large monitors, and electronic bulletin boards, the number of parasitic capacitors may increase exponentially, and thus, the parasitic capacitance increases at the same time. When the parasitic capacitance increases, a load of the receiving electrodes 11 increases, and for this reason, the sensing performance of the touch sensing unit 60 is degraded. That is, when the in-cell type touch panel according to the related art is applied to a large-size display device, the load of the receiving electrodes 11 increases due to the parasitic capacitance, and for this reason, the sensing performance of the touch sensing unit 60 is degraded.

Moreover, the in-cell type touch panel 40 according to the related art uses a differential driving method that compares the plurality of sensing signals received from two receiving electrodes, which are formed in parallel with the gate lines, to determine whether one of the two receiving electrodes is touched. However, as shown in FIG. 1, when the lowermost receiving electrode A, which is formed at a lowermost portion of the touch panel 40 among the receiving electrodes, is touched, there is no receiving electrode to be used for comparison with the lowermost receiving electrode A. In order to determine whether the lowermost receiving electrode A is touched, either a virtual sensing signal or a sensing signal received from the uppermost receiving electrode A, which is formed at a position opposite to the lowermost receiving electrode A, is used. In such cases, the determination of a touch on the lowermost driving electrode A may be inaccurate.

SUMMARY OF THE INVENTION

Accordingly, the present invention is directed to provide a display device and method of driving the same that substantially obviates one or more problems due to limitations and disadvantages of the related art.

An advantage of the present invention is to provide a display device and method of driving the same in which a smaller number of longitudinal electrodes than a number of horizontal electrodes are formed to cross the horizontal electrodes, and whether the horizontal electrodes are touched is determined by using a plurality of sensing signals received from the horizontal electrodes or one or more sensing signals received from the longitudinal electrodes during at least one of a plurality of touch sensing periods included in one frame period.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a display device may, for example, include a display panel including a plurality of gate lines, a plurality of data lines and a touch panel, the touch panel including a first touch electrode group where s number of horizontal electrodes and k (which is less than s) number of longitudinal electrodes cross each other; and a touch sensing unit that during a first period of a plurality of touch sensing periods included in a one frame period, determines whether at least one of the s number of horizontal electrodes is touched based on a plurality of sensing signals received from at least two of the s number of horizontal electrodes, and during a second period of the plurality of touch sensing periods, determines whether at least one of the s number of horizontal electrodes, which is either the same or different from the at least one of the s number of horizontal electrodes determined during the first period, is touched based on one or more sensing signals received from at least one of the k number of longitudinal electrodes.

In another aspect of the present invention, a method of driving a display device may, for example, include during first to kth touch sensing periods included in one frame period, determining whether first to s−1th horizontal electrodes which are formed in parallel with a plurality of gate lines formed in a panel are touched, in a touch panel which is built into the panel in an in-cell type, wherein s is a natural number more than k; during one of k+1st to sth touch sensing periods included in the one frame period, determining whether an sth horizontal electrode which is formed in parallel with the plurality of gate lines formed in the panel is touched, in the touch panel; and during a plurality of image display periods which are executed between the touch sensing periods included in the one frame period, displaying an image in the panel including the touch panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings. The same reference numbers may be used throughout the drawings to refer to the same or like parts.

Figure 3:
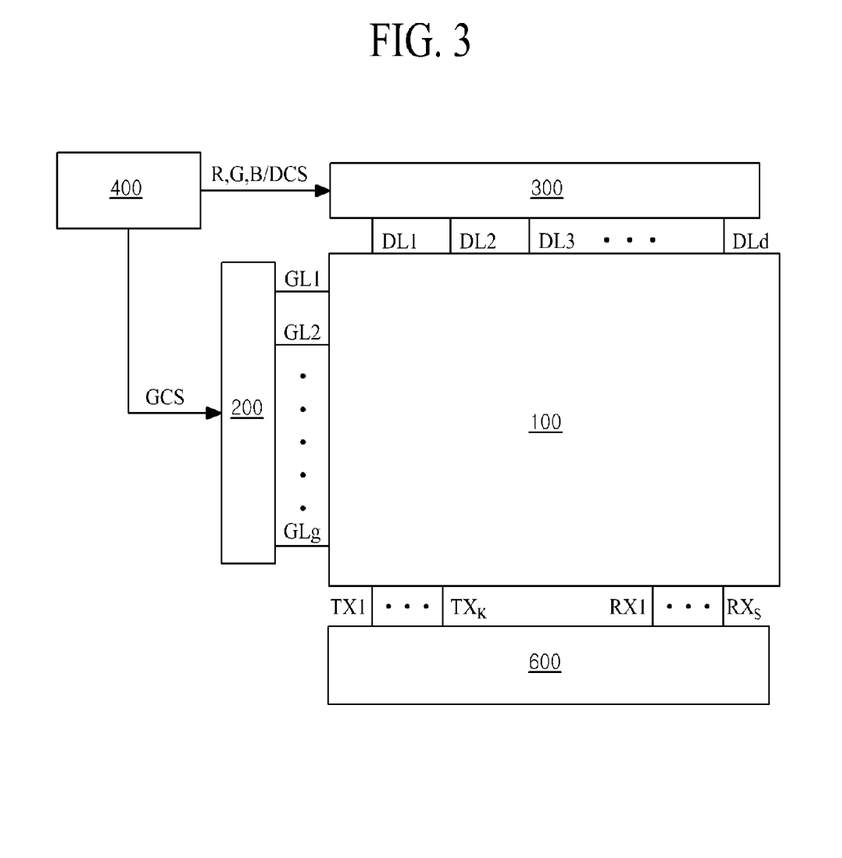
FIG. 3 is a diagram illustrating a display device according to an embodiment of the present invention.

FIG. 3 is a diagram illustrating a display device according to an embodiment of the present invention.

Referring to FIG. 3, the display device includes a display panel 100 in which an in-cell type touch panel is provided. The in-cell type touch panel includes a first touch electrode group where s number of horizontal electrodes RX1 to RXs, which may be formed in parallel with a plurality of gate lines, and k (which is less than s number) number of longitudinal electrodes TX1 to TXk cross each other.

The display device further includes a touch sensing unit 600 for determining whether the horizontal electrodes RX1 to RXs are touched based on a plurality of sensing signals received from the horizontal electrodes RX1 to RXs or based on a plurality of sensing signals received from the longitudinal electrodes TX1 to TXk during a plurality of touch sensing periods included in one frame period, and a panel driver for driving the display panel 100 to display an image.

The display panel 100 may be a liquid crystal panel, an organic light emitting panel, a plasma display panel, or an electrophoretic display panel. The display panel 100 may be manufactured by bonding a first substrate to a second substrate through a bonding process. An intermediate layer may be formed between the first substrate and the second substrate.

The first substrate and the second substrate may be formed of glass, plastic, or metal.

The intermediate layer may be different depending on types of the display device according to an embodiment of the present invention. For example, when the display device is an LCD device, the intermediate layer may include liquid crystal. When the display device is an organic light emitting display device, the intermediate layer may include an organic compound that emits light. When the display device is a PDP device, the intermediate layer may include an inert gas. When the display device is an EPD device, the intermediate layer may include e-ink.

Hereinafter, for convenience of description, a case in which the display panel 100 is a liquid crystal display panel will be described as an example of the present invention. That is, the present invention may be applied to various types of display devices in which a common electrode receiving a common voltage is formed in a plurality of pixels.

When the display panel 100 is a liquid crystal display panel, the display panel 100 includes a first substrate, a second substrate, and a liquid crystal layer between the first substrate and the second substrate.

The first substrate of the display panel 100 may be a thin film transistor (TFT) substrate. The first substrate may include a plurality of data lines DL1 to DLd, a plurality of gate lines GL1 to GLg crossing the data lines DL1 to DLd, a plurality of TFTs, which are respectively formed in a plurality of pixels defined by the crossings between the data lines DL1 to DLd and the gate lines GL1 to GLg, and a plurality of pixel electrodes for charging a data voltage into a corresponding pixel. The plurality of pixels may be arranged in a matrix formed by the crossings between the data lines DL1 to DLd and the gate lines GL1 to GLg.

The second substrate of the display panel 100 may be a color filter substrate. A black matrix (BM) and a color filter may be formed on the second substrate.

The display panel 100 may include a display area in which an image is displayed and a non-display area in which an image is not displayed. The plurality of pixels formed by the crossings between the data lines and the gate lines are formed in the display area.

The display area and the non-display area of the display panel 100 may be respectively formed at positions corresponding to a display area and a non-display area of the touch panel.

The touch panel includes the plurality of horizontal electrodes RX1 to RXs and the plurality of longitudinal electrodes TX1 to TXk.

The touch panel may be a capacitance type, and be built into the display panel 100. That is, the touch panel is an in-cell type touch panel according to an embodiment of the present invention.

The horizontal electrodes RX1 to RXs may be formed in parallel with the gate lines GL1 to GLg that are formed in the display panel 100. That is, the horizontal electrodes RX1 to RXs and the gate lines GL1 to GLg are formed in a width direction of the display panel 100 illustrated in FIG. 3.

The longitudinal electrodes TX1 to TXk are formed in the display panel 100 in a vertical direction to cross the horizontal electrodes. That is, the longitudinal electrodes are formed in a height direction of the display panel 100 illustrated in FIG. 3.

When a number of the horizontal electrodes RX1 to RXs is s, a number of the longitudinal electrodes TX1 to TXk has a value less than s.

During an image display period of one frame, a common voltage is supplied to the horizontal electrodes RX1 to RXs and the longitudinal electrodes TX1 to TXk. During a touch sensing period of one frame, a driving voltage is supplied to the horizontal electrodes RX1 to RXs or the longitudinal electrodes TX1 to TXk, and a plurality of sensing signals are received from the horizontal electrodes RX1 to RXs or the longitudinal electrodes TX1 to TXk.

That is, in the display device according to an embodiment of the present invention, the image display period and the touch sensing period are repeated a number of times corresponding to the number of the horizontal electrodes RX1 to RXs during one frame.

The display device according to an embodiment of the present invention may determine a touch on a horizontal electrode having a low touch sensitivity among the horizontal electrodes by using a residual touch sensing period among the plurality of touch sensing periods.

This will be described in detail with reference to FIGS. 4 to 7.

During the plurality of touch sensing periods included in one frame period, the touch sensing unit 600 determines whether the horizontal electrodes RX1 to RXs are touched by using a plurality of sensing signals received from the horizontal electrodes RX1 to RXs or a plurality of sensing signals received from the longitudinal electrodes TX1 to TXk.

To this end, the touch sensing unit 600 includes a driver, which outputs the driving voltage to the horizontal electrodes RX1 to RXs (or the longitudinal electrodes TX1 to TXk), and a receiver that receives the sensing signals from the longitudinal electrodes TX1 to TXk (or the horizontal electrodes RX1 to RXs).

The touch sensing unit 600 may determine whether the touch panel is touched by, for example, the differential driving method described in the Background section.

For example, the touch sensing unit 600 may compare a plurality of sensing signals received from two horizontal electrodes, which are formed, for example, in parallel with the gate lines to determine whether one of the two horizontal electrodes is touched by the differential driving method.

The panel driver may include a timing controller 400, a gate driver 200, and a data driver 300, as illustrated in FIG. 3.

The first timing controller 400 receives a timing signal including a data enable signal (DE) and a dot clock (CLK) from an external system to generate control signals GCS and DCS for controlling operation timings of the data driver 300 and the gate driver 200. Also, the timing controller 400 realigns input image data received from the external system to output the realigned image data to the data driver 300.

Moreover, the timing controller 400 may generate control signals to control an operation timing of the touch sensing unit 600.

In order to perform the above-described function, the timing controller 400 may include a receiver that receives the input image data and the timing signals from the external system, a control signal generator that generates various control signals, a data aligner that realigns the input image data to output the realigned image data, and an output unit that outputs the control signals and the image data.

The data driver 300 converts the image data input from the timing controller 400 into analog data voltages, and supplies, to the data lines, data voltages for one horizontal line at every one horizontal period during which a scan signal is supplied to the corresponding gate line. That is, the data driver 300 converts the image data into the data voltages by using gamma voltages supplied from a gamma voltage generator (not shown), and outputs the data voltages to the data lines.

The data driver 300 shifts a source start pulse (SSP) from the timing controller 400 according to a source shift clock (SSC) to generate a sampling signal. The data driver 300 latches image data RGB, which is input according to the source shift clock (SSC), according to the sampling signal to convert the image data into data voltages, and supplies the data voltages to the data lines on a one horizontal line basis in response to the source output enable signal (SOE).

To this end, the data driver 300 may include a shift register, a latch, a digital-to-analog converter (DAC), and an output buffer.

The gate driver 200 shifts a gate start pulse (GSP) transferred from the timing controller 400 according to a gate shift clock (GSC) to sequentially supply a gate-on voltage (Von) to the gate lines GL1 to GLg. The gate driver 200 supplies a gate-off voltage (Voff) to the gate lines GL1 to GLg during the remaining period where a scan signal of the gate-on voltage is not supplied.

The gate driver 200 may be manufactured independently from the display panel 100 and electrically connected to the display panel 100 in various types. However, the gate driver 200 may be provided in a gate-in panel (GIP) type where the gate driver 200 is built into the display panel 100.

Moreover, the data driver 300, the gate driver 200 and the timing controller 400 have been described above as being provided independently from each other, but the data driver 300 and/or the gate driver 200 may be provided as one body with the timing controller 400.

Hereinafter, a display device and method of driving the same according to the first embodiment of the present invention will be described in detail with reference to FIG. 4.

Figure 4:
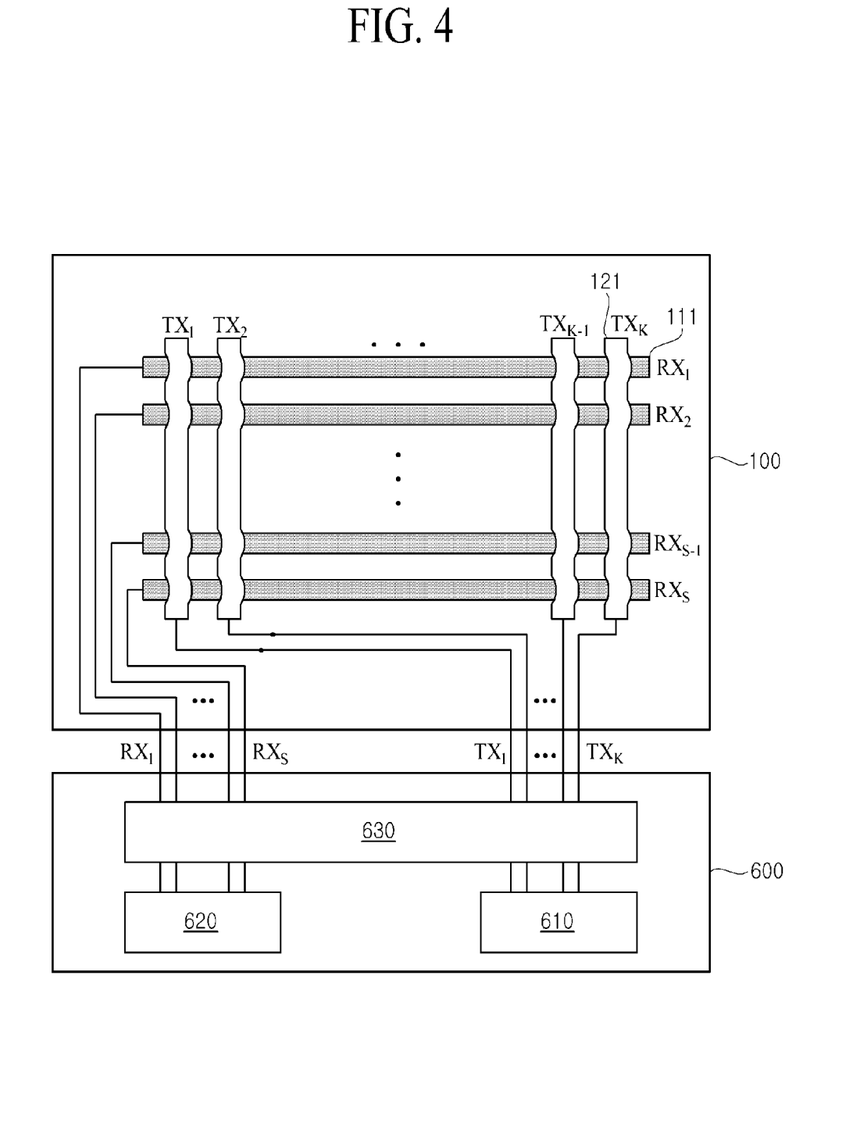
FIG. 4 is an exemplary diagram illustrating a display panel and a touch sensing unit applied to a display device according to the first embodiment of the present invention.
Figure 5:
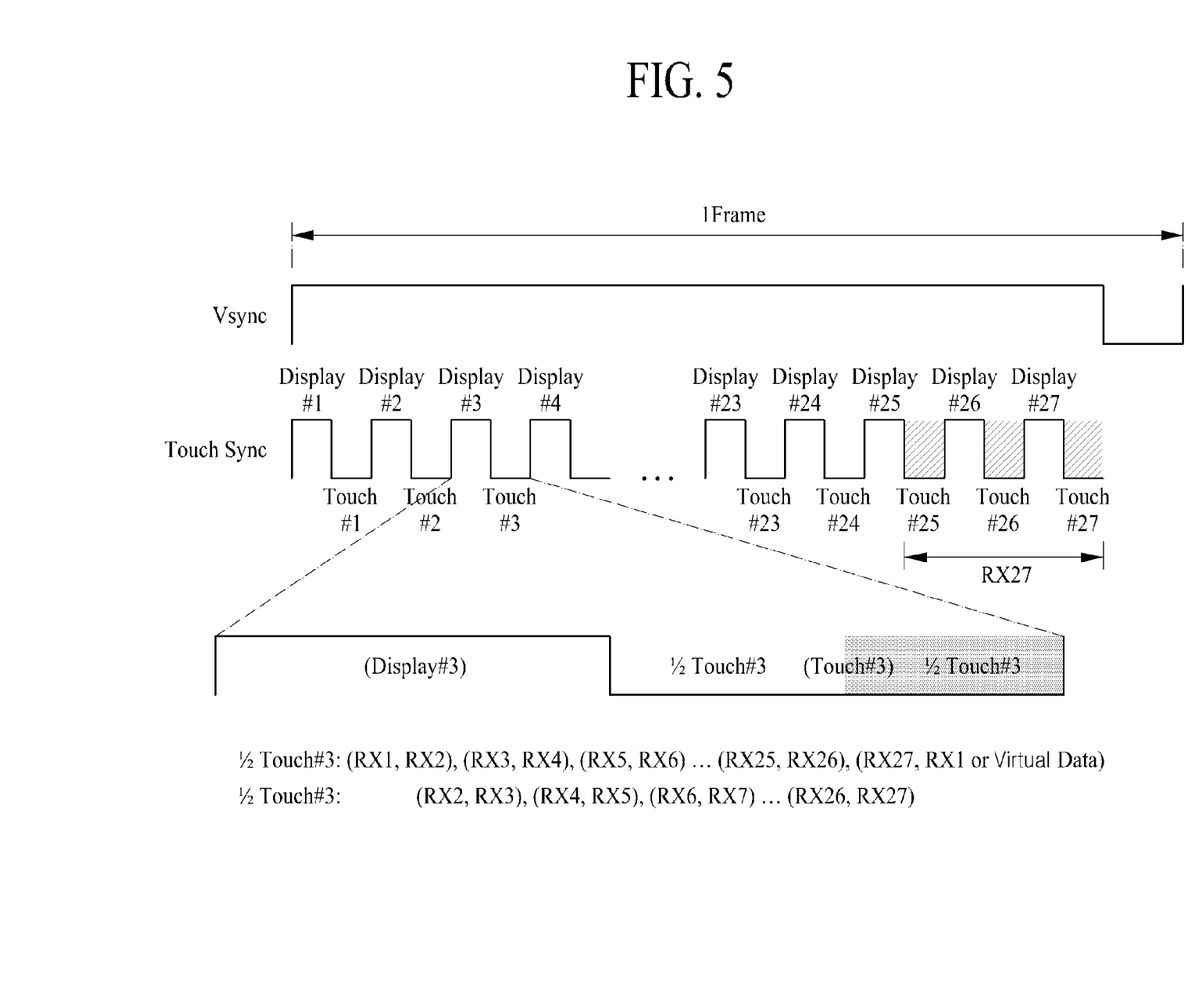
FIG. 5 is an exemplary diagram showing a touch sync signal applied to a method of driving a display device according to an embodiment of the present invention.

FIG. 4 is an exemplary diagram illustrating a display panel and a touch sensing unit applied to a display device according to the first embodiment of the present invention, and FIG. 5 is an exemplary diagram showing a touch sync signal applied to a method of driving a display device according to an embodiment of the present invention. In the following description, detailed descriptions of the same or similar features that are already described in detail may not be repeated or may be briefly described.

Referring to FIG. 4, the display device includes a display panel 100 in which an in-cell type touch panel is provided. The in-cell type touch panel includes a first touch electrode group where s number of horizontal electrodes RX1 to RXs, which may be formed in parallel with a plurality of gate lines, and k (which is less than s number) number of longitudinal electrodes TX1 to TXk cross each other.

The display device further includes a touch sensing unit 600 for determining whether the horizontal electrodes RX1 to RXs are touched based on a plurality of sensing signals received from the horizontal electrodes RX1 to RXs or based on a plurality of sensing signals received from the longitudinal electrodes TX1 to TXk during a plurality of touch sensing periods included in one frame period, and a plurality of panel drivers 200, 300 and 400 for driving the display panel 100 to display an image. Configurations of the panel drivers 200, 300 and 400 have been described above, and thus, their detailed descriptions are not provided.

As illustrated in FIG. 4, the s horizontal electrodes (RX1 to RXs) 111 formed in parallel with the plurality of gate lines GL1 to GLg and the k (which is less than s) longitudinal electrodes (TX1 to TXk) 121 are formed to cross each other in the display panel 100. In the following description, a case in which s and k are 27 and 24, respectively, will be described as an example of the present invention.

A plurality of image display periods (illustrated as Display in FIG. 5) and a plurality of touch sensing periods (illustrated as Touch in FIG. 5) are repeated during one frame period.

During the image display periods, a common voltage is supplied to the horizontal electrodes 111 and the longitudinal electrodes 121. In this case, the horizontal electrodes 111 and the longitudinal electrodes 121 perform a function of a common electrode.

During the touch sensing periods, the touch sensing unit 600 sequentially supplies a driving voltage to the longitudinal electrodes 121, and then determines whether the touch panel is touched by using a plurality of sensing signals received from adjacent horizontal electrodes 111. Alternatively, the touch sensing unit 600 sequentially supplies the driving voltage to the horizontal electrodes 111, and then determines whether the touch panel is touched by using a plurality of sensing signals received from adjacent longitudinal electrodes 121.

For example, when the driving voltage is supplied to an nth longitudinal electrode, the touch sensing unit 600 determines whether the nth horizontal electrode is touched based on the sensing signals received from an nth horizontal electrode and an n+1st horizontal electrode. Also, when the driving voltage is supplied to an mth horizontal electrode, the touch sensing unit 600 determines whether the mth horizontal electrode is touched based on the sensing signals received from a first longitudinal electrode and a kth longitudinal electrode. Here, n is a natural number which is more than one and less than s, and m is a natural number which is more than k and equal to s.

Referring to FIG. 5, when n is 3, during a third touch sensing period (Touch #3), the touch sensing unit 600 supplies the driving voltage to the third longitudinal electrode TX3. In this case, as shown in FIG. 5, during a half of the third touch sensing period (½ Touch #3), the touch sensing unit 600 may compare the sensing signals received from the first and second horizontal electrodes RX1 and RX2 and the sensing signals received from the third and fourth horizontal electrodes RX3 and RX4, thereby determining whether the odd-numbered horizontal electrodes are touched, including the third horizontal electrode RX3.

In this case, as shown in FIG. 5, the sensing signal that is compared with the sensing signal received from the 27th horizontal electrode RX27, which is last horizontal electrode in the example, is the one received from the first horizontal electrode RX1 or a virtual signal. As a result, whether the 27th horizontal electrode RX27 is touched may not be accurately determined.

Moreover, as shown in FIG. 5, during the other half of the third touch sensing period (½ Touch #3), the touch sensing unit 600 may compare the sensing signals received from the second horizontal and third electrodes RX2 and RX3 and the sensing signals received from the fourth and fifth horizontal electrodes RX4 and RX5, thereby determining whether even-numbered horizontal electrodes are touched.

The above-described operation is repeatedly performed until the driving voltage is supplied to the 24th longitudinal electrode TX24 that is the last longitudinal electrode.

As a result, when the $24^{th}$ touch sensing period (Touch #24) occurs, whether the horizontal electrodes and the longitudinal electrodes are touched may be primarily determined. That is, during the first touch sensing period (Touch #1) to the 24th touch sensing period (Touch #24), whether the horizontal electrodes and the longitudinal electrodes are touched may be primarily determined.

In this case, during the 25th image display period (Display #25) to the 27th image display period (Display #27), a common voltage is supplied to the 25th horizontal electrode to the 27th horizontal electrode. The 25th touch sensing period (Touch #25) to the 27th touch sensing period (Touch #27) respectively corresponding to the 25th image display period (Display #25) to the 27th image display period (Display #27) are included in one frame period.

As described above, during the first touch sensing period (Touch #1) to the 24th touch sensing period (Touch #24), whether the horizontal electrodes and the longitudinal electrodes are touched may be primarily determined.

However, during the first touch sensing period (Touch #1) to the 24th touch sensing period (Touch #24), the sensing signal that is compared with the sensing signal received from the 27th horizontal electrode RX27, which is the last horizontal electrode, is the one received from the first horizontal electrode RX1, or a virtual signal. As a result, whether the 27th horizontal electrode RX27 is touched may not be accurately determined.

According to an embodiment of the present invention, the 25th touch sensing period (Touch #25) to the 27th touch sensing period (Touch #27) are used to accurately determine whether the 27th horizontal electrode RX27 is touched. For example, during one of the 25th touch sensing period (Touch #25) to the 27th touch sensing period (Touch #27), the touch sensing unit 600 supplies the driving voltage to the 27th horizontal electrode. In this case, the touch sensing unit 600 may determine whether 27th horizontal electrode is touched based on the sensing signals received from the first longitudinal electrode TX1 to the kth longitudinal electrode TXk.

For example, when the driving voltage is supplied to the 27th horizontal electrode, the touch sensing unit 600 may analyze the sensing signals received from two adjacent longitudinal electrodes among the first longitudinal electrode TX1 to the kth longitudinal electrode TXk to determine whether there is a touch. Also, during another touch sensing period selected from the 25th touch sensing period (Touch #25) to the 27th touch sensing period (Touch #27), the touch sensing unit 600 supplies the driving voltage to the 26th horizontal electrode RX26, and determines whether 26th horizontal electrode is touched based on the sensing signals received from the first longitudinal electrode TX1 to the kth longitudinal electrode TXk. Moreover, during yet another touch sensing period selected from the 25th touch sensing period (Touch #25) to the 27th touch sensing period (Touch #27), the touch sensing unit 600 supplies the driving voltage to the 25th horizontal electrode RX25, and determines whether 25th horizontal electrode is touched based on the sensing signals received from the first longitudinal electrode TX1 to the kth longitudinal electrode TXk As described above, during the 25th touch sensing period (Touch #25) to the 27th touch sensing period (Touch #27), a virtual signal or a sensing signal received from the first horizontal electrode is used to determine whether the 27th horizontal electrode, which is at the lowermost portion among the first to 27th horizontal electrodes, is touched. For this reason, accuracy can be lowered. Also, since the 25th and 26th horizontal electrodes are formed at a lower portion of the display panel 100, an accuracy of determining whether there is a touch can be lowered. Thus, according to an embodiment of the present invention, the residual period of the 25th touch sensing period (Touch #25) to the 27th touch sensing period (Touch #27) may be additionally used to accurately determine whether the 25th horizontal electrode to the 27th horizontal electrode are touched by the touch sensing unit 600. The touch sensing unit 600 sequentially supplies the driving voltage to the 25th horizontal electrode to the 27th horizontal electrode, and determines whether the 25th horizontal electrode to the 27th horizontal electrode are touched based on the sensing signals received from the first horizontal electrode to the kth horizontal electrode.

The detailed description above will now be summarized.

First, during the first touch sensing period to the kth touch sensing period, the touch sensing unit 600 sequentially supplies a driving voltage to the first longitudinal electrode to the kth longitudinal electrode, and then determines whether the first horizontal electrode to an s–1st horizontal electrode are touched based on the sensing signals received from the first horizontal electrode to the sth horizontal electrode. For example, during each of the first touch sensing period to the 24th touch sensing period, the touch sensing unit 600 sequentially supplies the driving voltage to the first longitudinal electrode to the 24th longitudinal electrode, and determines whether the first horizontal electrode to the 26th horizontal electrode are touched.

Second, during one of k+1th to sth touch sensing periods, the touch sensing unit 600 sequentially supplies the driving voltage to an sth horizontal electrode, and then determines whether the sth horizontal electrode is touched based on the sensing signals received from first to kth longitudinal electrodes. For example, during one of 25th to 27th touch sensing periods, the touch sensing unit 600 sequentially supplies the driving voltage to the 27th horizontal electrode, and then determines whether the 27th horizontal electrode is touched based on the sensing signals received from the first to kth longitudinal electrodes TX1 to TXk.

Also, during the other residual touch sensing period of the 25th to 27th touch sensing periods, the touch sensing unit 200 may determine whether the 25th longitudinal electrode and the 26th longitudinal electrode are touched.

Moreover, when the number of the horizontal electrodes is 29 instead of 27, determining whether the horizontal electrodes are touched may be unstable or inaccurate, and thus, the touch sensing unit 600 may further determine whether the horizontal electrodes are touched by using the above-described method.

In order to perform the above-described method, as illustrated in FIG. 4, the touch sensing unit 600 includes a driver 610 for sequentially outputting a driving voltage, a receiver 620 for receiving a sensing signal to determine whether there is a touch, and a switching unit 630 for, during the first to kth touch sensing periods (Touch #1) to (Touch #k), connecting the driver 610 to the first to kth longitudinal electrodes TX1 to TXk and connecting the receiver 620 to the first to sth horizontal electrodes RX1 to RXs, and during the k+1st to sth touch sensing periods (Touch #k+1) to (Touch #s), connecting the driver 610 to the first to sth horizontal electrodes RX1 to RXs and connecting the receiver 620 to the first to kth longitudinal electrodes TX1 to TXk.

For example, during the first to 24th touch sensing periods (Touch #1) to (Touch #24), the switching unit 630 connects the driver 610 to the first to 24th longitudinal electrodes TX1 to TX24, and connects the receiver 620 to the first to 27th horizontal electrodes RX1 to RX27, to determine whether the first to 26th horizontal electrodes RX1 to RX26 are touched.

Moreover, during the 25th to 27th touch sensing periods (Touch #25) to (Touch #27), the switching unit 630 connects the driver 610 to the first to 27th horizontal electrodes RX1 to RX27, and sequentially applies the driving voltage to the 25th to 27th horizontal electrodes RX25 to RX27, and the touch sensing unit 600 analyzes a plurality of sensing signals received from the first to 24th longitudinal electrodes TX1 to TX24 to determine whether the 25th to 27th horizontal electrodes RX25 to RX27 are touched.

According to an embodiment of the present invention, during the 25th to 27th touch sensing periods (Touch #25) to (Touch #27), whether the 27th horizontal electrode is touched is determined, and during the other residual or remaining touch sensing period, whether the horizontal electrodes, touches of which were previously determined, are touched may be additionally determined to increase accuracy.

Hereinafter, a display device and method of driving the same according to the second embodiment of the present invention will be described in detail with reference to FIGS. 6 and 7.

Figure 6:
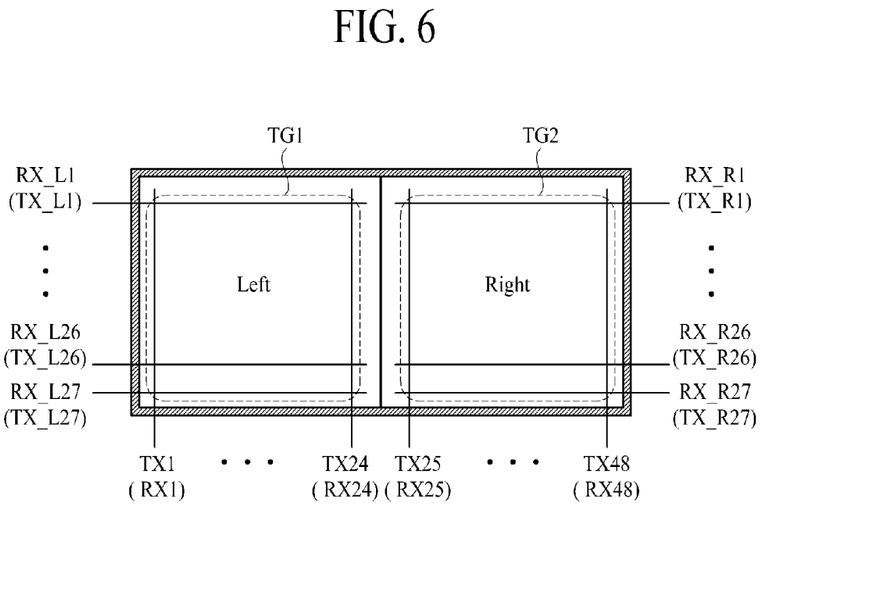
FIG. 6 is an exemplary diagram illustrating a display panel applied to a display device according to the second embodiment of the present invention.
Figure 7:
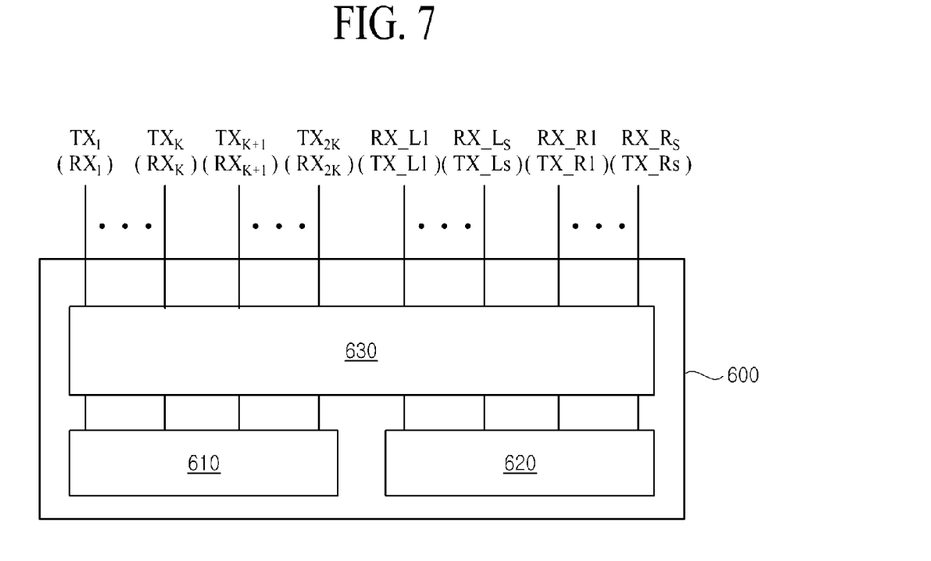
FIG. 7 is an exemplary diagram illustrating a touch sensing unit applied to a display device according to the second embodiment of the present invention.

FIG. 6 is an exemplary diagram illustrating a display panel applied to a display device according to the second embodiment of the present invention, and FIG. 7 is an exemplary diagram illustrating a touch sensing unit applied to a display device according to the second embodiment of the present invention. In the following description, detailed descriptions of the same or similar features that are already described in detail may not be repeated or may be briefly described. In particular, the configurations of the panel drivers 200, 300 and 400 have been described above, and thus, their detailed descriptions are not provided.

The display device according to the second embodiment of the present invention includes a display panel 100 in which an in-cell type touch panel is provided. The in-cell type touch panel includes a first touch electrode group where s number of horizontal electrodes RX1 to RXs, which may be formed in parallel with a plurality of gate lines, and k (which is less than s number) number of longitudinal electrodes TX1 to TXk cross each other.

The display device further includes a touch sensing unit 600 for determining whether the horizontal electrodes RX1 to RXs are touched based on a plurality of sensing signals received from the horizontal electrodes RX1 to RXs or based on a plurality of sensing signals received from the longitudinal electrodes TX1 to TXk during a plurality of touch sensing periods included in one frame period, and a plurality of panel drivers 200, 300 and 400 for driving the display panel 100 to display an image.

In addition to these elements, as illustrated in FIGS. 5 and 6, the display device according to the second embodiment of the present invention further includes a second touch electrode group TG2 where s number of other horizontal electrodes RX_R1 to RX_Rs, which may be formed in parallel with the gate lines GL1 to GLg, and k number of other longitudinal electrodes TXk+1 to TX2k cross each other in the other side direction of the gate lines GL1 to GLg.

As illustrated in FIGS. 6 and 7, the touch panel includes a first touch electrode group TG1 where s number of horizontal electrodes RX_L1 to RX_Ls, which may be formed in parallel with the gate lines, and k (which is less than s number) number of longitudinal electrodes TX1 to TX2k cross each other in one side direction (a left direction in FIG. 6) of the gate lines, and a second touch electrode group TG2 where the other horizontal electrodes RX_R1 to RX_Rs, which may be formed in parallel with the gate lines, and the other k longitudinal electrodes TXk+1 to TX2k cross each other in the other side direction (a right direction in FIG. 6) of the gate lines.

In the display panel 100 applied to the second embodiment of the present invention, a long axis (an abscissa axis in FIG. 6) of the display panel 100 is divided into two regions. The first touch electrode group TG1 is formed at one side (a left side in FIG. 6) of the long axis, and the second touch electrode group TG2 is formed at the other side (a right side in FIG. 6) of the long axis.

As described in the Background section, left and right widths of the display panel 100 illustrated in FIG. 4 are enlarged, and thus, when the length of the receiving electrodes becomes longer, a load of the receiving electrodes increases due to the parasitic capacitance generated in the display panel 100. As a result, the sensing performance of the touch sensing unit 600 may be degraded.

To solve such a problem, in a large-sized display panel where a length of an abscissa axis becomes longer, as illustrated in FIGS. 6 and 7, the horizontal electrodes are divided into two groups with respect to the abscissa axis, and the divided horizontal electrodes are included in different touch electrode groups. In this case, the touch sensing unit 600 may separately drive the two touch electrode groups TG1 and TG2 by the method described above with reference to FIG. 4.

In the display device and method of driving the same according to the second embodiment of the present invention, during a plurality of touch sensing periods included in one frame period where the first touch electrode group TG1 described above with reference to FIG. 4 is driven, the touch sensing unit 600 determines whether the horizontal electrodes RX_R1 to RX_R27 are touched based on a plurality of sensing signals received from the horizontal electrodes RX_R1 to RX_R27 constituting the second touch electrode group TG2 or based on a plurality of sensing signals received from the longitudinal electrodes TX25 to TX48 constituting the second touch electrode group TG2.

First, during the first to kth touch sensing periods, the touch sensing unit 600 sequentially supplies a driving voltage to the first to kth longitudinal electrodes constituting the second touch electrode group TG2, and then determines whether the first to s–1st horizontal electrodes are touched based on the sensing signals received from the first to sth horizontal electrodes constituting the second touch electrode group TG2

For example, during the first to 24th touch sensing periods (Touch #1) to (Touch #24), the touch sensing unit 600 drives the first touch electrode group, and simultaneously, sequentially supplies a driving voltage to the 25th to 48th longitudinal electrodes TX25 to TX48 constituting the second touch electrode group TG2, and then determines whether the first to 26th horizontal electrodes RX_R1 to RX_R26 are touched based on the sensing signals received from the first to 27th horizontal electrodes RX_R1 to RX_R27 constituting the second touch electrode group TG2.

Second, during one of the k+1st to sth touch sensing periods, the touch sensing unit 600 supplies the driving voltage to an sth horizontal electrode constituting the second touch electrode group, and then determines whether the sth horizontal electrode constituting the second touch electrode group is touched based on the sensing signals received from the first to kth longitudinal electrodes constituting the second touch electrode group.

For example, during the 25th to 27th touch sensing periods (Touch #25) to (Touch #27), the touch sensing unit 600 drives the first touch electrode group, and simultaneously, sequentially supplies the driving voltage to a 27th horizontal electrode RX_R27 constituting the second touch electrode group, and then determines whether the 27th horizontal electrode RX_R27 constituting the second touch electrode group is touched based on the sensing signals received from the first to 48th longitudinal electrodes TX25 to TX48 constituting the second touch electrode group.

In this case, during the 25th to 27th touch sensing periods (Touch #25) to (Touch #27), the touch sensing unit 600 sequentially supplies the driving voltage to 25th to 27th horizontal electrode RX_R25 to RX_R27 constituting the second touch electrode group TG2, and then determines whether the 25th to 27th horizontal electrode RX_R25 to RX_R27 are touched based on the sensing signals received from the 25th to 48th longitudinal electrodes.

The first touch electrode group TG1 and the second touch electrode group TG2 may operate separately from each other, and the second touch electrode group TG2 may be driven by the same method as the method of driving the first touch electrode group TG1 described above with reference to FIGS. 4 and 5.

The number of the horizontal electrodes configuring the first touch electrode group TG1 may be equal to the number of the horizontal electrodes configuring the second touch electrode group TG2, and the number of the longitudinal electrodes configuring the first touch electrode group TG1 may be equal to the number of the longitudinal electrodes configuring the second touch electrode group TG2. In this case, in each of the first and second touch electrode groups TG1 and TG2, s, which is the number of the horizontal electrodes, is greater than k, which is the number of the longitudinal electrodes.

According to an embodiment of the present invention, whether horizontal electrodes formed at a lowermost portion are touched may be additionally determined during a plurality of touch sensing periods equal to a number corresponding to "s−k".

For example, when s is 30 and k is 24, a total of six touch sensing periods remain. During the remaining six touch sensing periods, the touch sensing unit 600 may additionally determine whether the lowermost horizontal electrode (the 30th horizontal electrode) is touched by one of the methods described above. Also, during the remaining five touch sensing periods, the touch sensing unit 600 may additionally determine whether one or more of the 25th to 29th horizontal electrodes are touched. Alternatively, during the remaining five touch sensing periods, the touch sensing unit 600 may, for example, additionally determine whether the first to fifth horizontal electrodes are touched.

During the residual touch sensing periods, information about a plurality of horizontal electrodes for which a touch is additionally determined may be stored in the touch sensing unit 600 or the timing controller 400. That is, the touch sensing unit 600 collects information about a plurality of horizontal electrodes, for which determination of a touch is additionally needed, from the information stored in the touch sensing unit 600 or the timing controller 400. Subsequently, during the remaining touch sensing periods, the touch sensing unit 600 determines whether the horizontal electrodes are touched.

In order to perform the above-described method, as illustrated in FIG. 7, the touch sensing unit 600 includes a driver 610 for sequentially outputting the driving voltage, a receiver 620 for receiving a sensing signal to determine whether there is a touch, and a switching unit 630 for, during the first to kth touch sensing periods (Touch #1) to (Touch #k), connecting the driver 610 to the first to 2kth longitudinal electrodes TX1 to TX2k constituting the first and second touch electrode groups TG1 and TG2 and connecting the receiver 620 to the first horizontal electrode RX_L1 and RX_R1 to the sth horizontal electrodes RX_Ls and RX_Rs constituting the first and second touch electrode groups TG1 and TG2, and during the k+1st to sth touch sensing periods (Touch #k+1) to (Touch #s), connecting the driver 610 to the sth horizontal electrodes RX_Ls and RX_Rs constituting the first and second touch electrode groups TG1 and TG2 and connecting the receiver 620 to the first to 2kth longitudinal electrodes TX1 to TX2k constituting the first and second touch electrode groups TG1 and TG2.

In FIGS. 6 and 7, reference numerals without parenthesis '( )' referring to the horizontal electrodes and the longitudinal electrodes denote functions which are performed by the horizontal electrodes and the longitudinal electrodes during the first to kth touch sensing periods (Touch #1) to (Touch #k), and reference numerals with parenthesis '( )' denote functions which are performed by the horizontal electrodes and the longitudinal electrodes during the k+1st to sth touch sensing periods (Touch #k+1) to (Touch #s).

For example, in FIG. 6, during the first to kth touch sensing periods (Touch #1) to (Touch #k), a plurality of horizontal lines perform a function of a receiving electrode RX, and a plurality of longitudinal lines perform a function of a driving electrode TX.

Moreover, during the k+1st to sth touch sensing periods (Touch #k+1) to (Touch #s), the plurality of horizontal lines perform the function of the driving electrode TX, and the plurality of longitudinal lines perform the function of the receiving electrode RX.

A method of driving a display device according to embodiments of the present invention will be briefly summarized below.

A method of driving a display device including a display panel into which an in-cell type touch panel is built according to an embodiment of the present invention includes during first to kth touch sensing periods included in one frame period, determining whether first to s−1th horizontal electrodes, which may be formed in parallel with a plurality of gate lines formed in the display panel, are touched, during one of k+1st to sth touch sensing periods included in the one frame period, determining whether a sth horizontal electrode, which may be formed in parallel with the plurality of gate lines formed in the display panel is touched, and during a plurality of image display periods, which are between the touch sensing periods included in the one frame period, displaying an image in the display panel. Here, s is a natural number greater than k.

In particular, determining whether the first to s−1th horizontal electrodes are touched includes, during the first to kth touch sensing periods, sequentially driving a driving voltage to first to kth longitudinal electrodes, which may be formed to cross the horizontal electrodes, and determining whether the first to s−1st horizontal electrodes are touched based on the sensing signals received from the first to sth horizontal electrodes.

Moreover, determining whether the sth horizontal electrode is touched includes, during one of the k+1st to sth touch sensing periods, supplying the driving voltage to an sth horizontal electrode, and determining whether the sth horizontal electrode is touched based on the sensing signals received from the first to kth longitudinal electrodes.

According to an embodiment of the present invention, a touch sensitivity of horizontal electrodes that are formed at an edge portion of the display panel including the lowermost portion can be enhanced. Also, parasitic capacitance generated in the touch panel can be reduced, and thus, touch performance can be enhanced. As a result, a touch panel according to an embodiment of the present invention, which is, for example, an in-cell type built into the display panel, can be applied to a large-sized display device.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device comprising:
a display panel including a plurality of gate lines, a plurality of data lines and a touch panel, the touch panel including a first touch electrode group where s number of horizontal electrodes and k (which is less than s) number of longitudinal electrodes cross each other; and
a touch sensing unit that during a first period of a plurality of touch sensing periods included in a one frame period, determines whether at least one of the s number of horizontal electrodes is touched based on a plurality of sensing signals received from at least two of the s number of horizontal electrodes, and during a second period of the plurality of touch sensing periods in the one frame period, determines whether at least one of the s number of horizontal electrodes, which is either the same or different from the at least one of the s number of horizontal electrodes determined during the first period, is touched based on one or more sensing signals received from at least two of the k number of longitudinal electrodes,
wherein a driving voltage is alternatively supplied to the horizontal electrodes and the longitudinal electrodes in the one frame period, wherein the driving voltage is supplied to the longitudinal electrodes during the first period and the driving voltage is supplied to the horizontal electrodes during the second period, and wherein the first and second periods, which are different from each other, are touch sensing periods in the one frame period.

2. The display device of claim 1, wherein,
during the first period, the touch sensing unit sequentially supplies the driving voltage to the longitudinal electrodes, and determines whether the touch panel is touched, by using a plurality of sensing signals received from adjacent horizontal electrodes, and
during the second period, the touch sensing unit sequentially supplies the driving voltage to the horizontal electrodes, and determines whether the touch panel is touched, by using a plurality of sensing signals received from adjacent longitudinal electrodes.

3. The display device of claim 1, wherein,
When the driving voltage is supplied to an nth longitudinal electrode, by using a plurality of sensing signals received from an p (which is less than s number) th horizontal electrode and an p+1st horizontal electrode, the touch sensing unit determines whether the pth horizontal electrode is touched, and
when the driving voltage is supplied to an mth horizontal electrode, by using a plurality of sensing signals received from a first longitudinal electrode and a kth longitudinal electrode, the touch sensing unit determines whether the mth horizontal electrode is touched.

4. The display device of claim 1, wherein,
during first to kth touch sensing periods included in the first period, the touch sensing unit sequentially supplies the driving voltage to first to kth longitudinal electrodes, and by using a plurality of sensing signals received from first to sth horizontal electrodes, the touch sensing unit determines whether the first to s−1st horizontal electrodes are touched, and
during one of k+1st to sth touch sensing periods included in the second period, the touch sensing unit supplies the driving voltage to the sth horizontal electrode, and by using a plurality of sensing signals received from first to kth longitudinal electrodes, the touch sensing unit determines whether the sth horizontal electrode is touched.

5. The display device of claim 1, wherein the touch sensing unit comprises:
the first touch electrode group formed in one side direction of the plurality of gate lines; and
a second touch electrode group in which s number of horizontal electrodes formed in parallel with the plurality of gate lines and k number of other longitudinal electrodes are formed to intersect each other in the other side direction of the plurality of gate lines.

6. The display device of claim 5, wherein,
during the first period of the plurality of touch sensing periods included in the one frame period, by using a plurality of sensing signals received from the horizontal electrodes constituting the second touch electrode group, the touch sensing unit determines whether the horizontal electrodes are touched, and
during the second period, by using a plurality of sensing signals received from the longitudinal electrodes constituting the second touch electrode group, the touch sensing unit determines whether the horizontal electrodes are touched.

7. The display device of claim 5, wherein,
during first to kth touch sensing periods included in the first period, the touch sensing unit sequentially supplies the driving voltage to first to kth longitudinal electrodes constituting the second touch electrode group, and by using a plurality of sensing signals received from first to sth horizontal electrodes constituting the second touch electrode group, the touch sensing unit determines whether the first to s−1st horizontal electrodes are touched, and
during one of k+1st to sth touch sensing periods included in the second period, the touch sensing unit supplies the driving voltage to an sth horizontal electrode constituting the second touch electrode group, and by using a plurality of sensing signals received from the first to kth longitudinal electrodes constituting the second touch electrode group, the touch sensing unit determines whether the sth horizontal electrode constituting the second touch electrode group is touched.

8. The display device of claim 1, wherein the touch sensing unit comprises:
a driver configured to sequentially output a driving voltage;
a receiver configured to receive a sensing signal to determine whether there is a touch; and
a switching unit configured to, during first to kth touch sensing periods included in the first period, connect the driver to first to kth longitudinal electrodes and connect the receiver to first to sth horizontal electrodes, and during k+1st to sth touch sensing periods included in the second period, connect the driver to the first to sth horizontal electrodes and connects the receiver to the first to kth longitudinal electrodes.

9. The display device of claim 1, wherein the touch panel is an in-cell type touch panel.

10. The display device of claim 9, wherein the s number of horizontal electrodes are provided substantially in parallel with the plurality of gate lines in the display panel.

11. A method of driving a display device, the method comprising:

during first to kth touch sensing periods included in one frame period, determining whether first to s−1th horizontal electrodes which are formed in parallel with a plurality of gate lines formed in a panel are touched by using a plurality of sensing signals received from the first to sth horizontal electrodes, in a touch panel which is built into the panel in an in-cell type, wherein s is a natural number more than k;

during at least two of k+1st to sth touch sensing periods included in the one frame period, determining whether the sth horizontal electrode which is formed in parallel with the plurality of gate lines formed in the panel is touched by using a plurality of sensing signals received from first to kth longitudinal electrodes crossing the first to sth horizontal electrodes, in the touch panel; and during a plurality of image display periods which are executed between the touch sensing periods included in the one frame period, displaying an image in the panel including the touch panel, wherein a driving voltage is alternatively supplied to the horizontal electrodes and the longitudinal electrodes in the one frame period, wherein the driving voltage is supplied to the longitudinal electrodes during the first period and the driving voltage is supplied to the horizontal electrodes during the second period, and wherein the first and second periods, which are different from each other, are touch sensing periods in the one frame period.

12. The method of claim 11, wherein, the determining of whether the first to s−1th horizontal electrodes are touched comprises, during the first to kth touch sensing periods, sequentially driving the driving voltage to the first to kth longitudinal electrodes, determining whether the first to s−1st horizontal electrodes are touched, and the determining of whether the sth horizontal electrode is touched comprises, during one of the k+1st to sth touch sensing periods, supplying the driving voltage to the sth horizontal electrode, determining whether the sth horizontal electrode is touched.

* * * * *